UNITED STATES PATENT OFFICE.

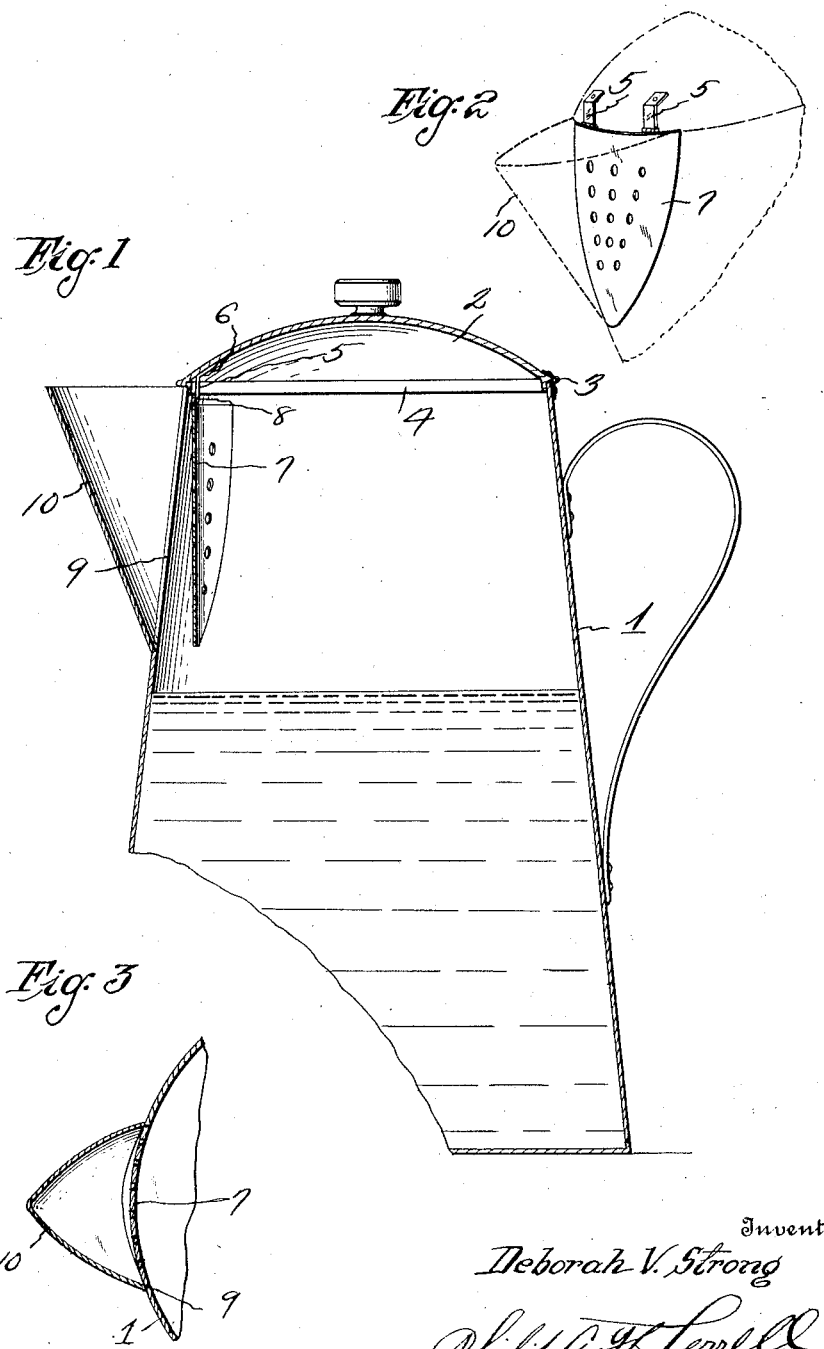

DEBORAH V. STRONG, OF AKRON, INDIANA.

TEAPOT-STRAINER.

1,339,008.  Specification of Letters Patent.  Patented May 4, 1920.

Application filed March 9, 1920. Serial No. 364,567.

*To all whom it may concern:*

Be it known that I, DEBORAH V. STRONG, a citizen of the United States, residing at Akron, in the county of Fulton and State of Indiana, have invented certain new and useful Improvements in Teapot-Strainers, of which the following is a specification, reference being had therein to the accompanying drawing.

The invention relates to tea pots and has for its object to provide a cover carried strainer which is hingedly connected to the cover adjacent its edge and at a diametrically disposed point to the hinging point of the cover so that when the cover is closed the strainer will register with the opening of the spout of the tea pot and swing into engagement with the inner wall of the tea pot as the tea pot is tilted during a pouring operation, thereby preventing dregs from entering the spout and collecting therein. The hinging of the strainer allowing the strainer when the pot is not in use to swing away from engagement with the spout opening so that dregs or other solid matter will flow back into the pot. Also to provide a hinged strainer carried by the cover so that the tea pot spout may be easily and quickly cleaned.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a vertical sectional view through a conventional form of tea or coffee pot showing the strainer applied thereto.

Fig. 2 is a perspective view of the strainer showing the same in position in engagement with the spout of the tea pot.

Fig. 3 is a detail horizontal sectional view through the spout showing the same in closed position.

Referring to the drawings, the numeral 1 designates a conventional form of tea or coffee pot and 2 the cover thereof, which cover is hingedly connected to the coffee pot as at 3. The cover 2 is provided with a downwardly extending flange 4 which engages the opening of the pot 1. Hingedly connected to downwardly extending brackets 5, which are secured to the cover 2 as at 6 is a perforated plate 7, which forms a strainer, said strainer being hingedly connected to the bracket 5 as at 8. The strainer plate 7 is semi-circular in horizontal cross section and conforms to the curvature of the inner face of the coffee pot and is larger than the spout opening 9 of the spout 10. As the pot is tilted it will be seen that the strainer plate 7 will cover the spout opening 9 and prevent, as far as possible, the entrance of dregs or tea leaves into the spout 10. However, by hinging the strainer plate 7 it will be seen that when the coffee pot is not in use and is in the position shown in Fig. 1, that the strainer plate 7 will swing inwardly at its lower end thereby allowing the dregs or small particles which may have passed through the perforated strainer plate to flow back into the pot. It will also be seen that by having the strainer plate carried by the cover 2 that it will be possible to thoroughly cleanse the spout, which is not possible in the conventional form of pot now on the market. An additional advantage is obtained by hinging the strainer plate 7 instead of simply securing the same to the flange 4, and that is that when the cover 2 is opened the strainer plate 7 will pivot inwardly and be out of the way so that the interior of the pot may be easily cleansed.

The invention having been set forth what is claimed as new and useful is:—

1. The combination with a coffee pot having a hinged cover thereon, and a spout adjacent the upper end thereof, of a strainer hingedly connected to the cover at a point opposite the hinging point of said cover, said strainer when the pot is tilted being so positioned as to register with the spout opening and strain the contents of the pot as it is poured through the spout.

2. The combination with a coffee pot having a hinged cover thereon and a spout adjacent the upper end thereof, of a strainer carried by the cover and hingedly connected thereto, said strainer being so positioned that when the pot is tilted it will register with the spout opening and strain the fluid being poured from the spout.

3. The combination with a coffee pot having a hinged cover thereon and a spout adjacent the upper end thereof, of a strainer hingedly connected to the cover, said strainer being so positioned that when the pot is tilted it will register with the spout opening and strain the fluid being poured from the pot and also so hinged that after a pouring operation the strainer will assume a position away from the spout and allow the dregs that may have collected in the spout to flow back into the pot.

In testimony whereof I hereunto affix my signature.

DEBORAH V. STRONG.